United States Patent [19]

Hashimoto

[11] Patent Number: 5,194,788
[45] Date of Patent: Mar. 16, 1993

[54] SERVO CIRCUIT
[75] Inventor: Shuichi Hashimoto, Tokyo, Japan
[73] Assignee: Fujitsu Limited, Kawasaki, Japan
[21] Appl. No.: 460,525
[22] Filed: Jan. 3, 1990
[30] Foreign Application Priority Data
Jan. 10, 1989 [JP] Japan ................. 1-003191
[51] Int. Cl.$^5$ ............................................. G05B 13/00
[52] U.S. Cl. ................................. 318/561; 318/594;
318/592; 360/75
[58] Field of Search ................. 318/560-640,
318/75, 653; 360/70, 77

[56] References Cited
U.S. PATENT DOCUMENTS

| 4,096,425 | 6/1978 | Brown et al. | 318/561 |
| 4,184,108 | 1/1980 | Sordello et al. | 318/618 |
| 4,237,502 | 12/1980 | Erickson et al. | 318/561 X |
| 4,288,731 | 9/1981 | Lee et al. | 318/561 X |
| 4,578,723 | 3/1986 | Betts et al. | 360/77 |
| 4,609,855 | 8/1986 | Andrews et al. | 318/561 |
| 4,636,883 | 1/1987 | Hashimoto | 360/78 |
| 4,697,127 | 9/1987 | Stich et al. | 318/561 |
| 4,710,865 | 12/1987 | Higomura | 318/594 X |
| 4,724,369 | 2/1988 | Hashimoto | 318/561 |
| 4,988,933 | 7/1991 | Ogawa | 318/561 |

FOREIGN PATENT DOCUMENTS

0272076  6/1988  European Pat. Off. .
1-311478 12/1989  Japan .

Primary Examiner—William M. Shoop, Jr.
Assistant Examiner—David Martin
Attorney, Agent, or Firm—Staas & Halsey

[57] ABSTRACT

A servo circuit having a speed detection circuit for detecting a real speed from a position signal from an object under servo control. A speed error detection circuit generates an error between a target speed and the real speed. A position error detection circuit generates a position error signal from the position signal. A switching unit switches connection of the servo object to the speed error detection circuit and the position error detection circuit. A main processing unit controls the switching of the switching unit. Near the target position, speed control by the speed error detection circuit is switched to position control by the position error detection circuit. A speed detection gain adjustment unit is provided in the speed detection circuit. The main processing unit measures the intervals between the position signals and, based on the measured value, changes the detection gain of the speed detection gain adjustment unit.

10 Claims, 11 Drawing Sheets

SERVO CIRCUIT

BACKGROUND OF THE INVENTION (1) Field of The Invention

The present invention relates to a servo circuit for controlling the positioning of an object under servo control (hereinafter referred to as a "servo object") to a target position by speed control and then position control.

(2) Description of the Related Art

Wide use is being made of servo positioning circuits for the positioning of magnetic heads on tracks of magnetic disk devices. In such servo positioning circuits, there is a desire for a technique enabling stable positioning even at high speeds.

Speed control is performed by supplying to a voice coil motor the difference between a target speed controlled by a difference counter decremented by a track crossing pulse and a speed signal prepared from a differential signal obtained from a position signal and a current detection signal.

In the preparation of the control speed, with a high speed seek (movement), the number of position signals per unit time is high, and along with this there are many differential signals generated, so the gap between the speed signal prepared by the circuit and the actual speed is not that large. However, when the speed becomes low, the number of differential signals per unit time falls and the gap with the actual speed increases.

To cover for this, the current detection signal is being added to, but no great improvement can be expected from this. That is, the maximum speed has been rising more and more in recent years so as to enable high speed seek operations, but the amount of adding of the current detection signal cannot be increased along with the speed. The reason is that during a high speed seek operation, the current detection signal is not required, so it is not possible to add a large enough amount as to have an impact on the high speed seek operation.

This difference with the actual speed during low speed operation is particularly a problem in a deceleration process. A problem has arisen in which the following characteristic of the servo object falls when deceleration is completed. Therefore, a possibility has arisen of overshooting or undershooting occurring due to relaxation of the magnetic flux of the voice coil motor, effects of weight of the voice coil motor in the seek direction, air flow due to rotation of the magnetic disk, or other outside disturbances.

SUMMARY OF THE INVENTION

The present invention has as its object the reduction of the gap between the prepared speed signal and actual speed and improvement of the following characteristic during the time for completion of deceleration.

The present invention realizes this object by providing a servo circuit having a speed detection circuit for detecting a real speed from a position signal from an object under servo control; a speed error detection circuit for generating an error between a target speed and the real speed; a position error detection circuit for generating a position error signal from the position signal; a switching unit for switching connection of the servo object to the speed error detection circuit or the position error detection circuit; and a main processing unit for controlling the switching of the switching unit, in the vicinity of the target position. Speed control by the speed error detection circuit is switched to position control by the position error detection circuit. Provision are made for a speed detection gain adjustment unit in the speed detection circuit. The main processing unit measures the intervals between the position signals and based on the measured value changes the detection gain of the speed detection gain adjustment unit.

BRIEF DESCRIPTION OF THE DRAWINGS

FIG. 7a, 7 b, and 7c is a flow chart of the seek processing of the present invention.

DESCRIPTION OF THE PREFERRED EMBODIMENTS

Before describing the preferred embodiments, a more detailed explanation will be given of the prior art.

Figure 1:
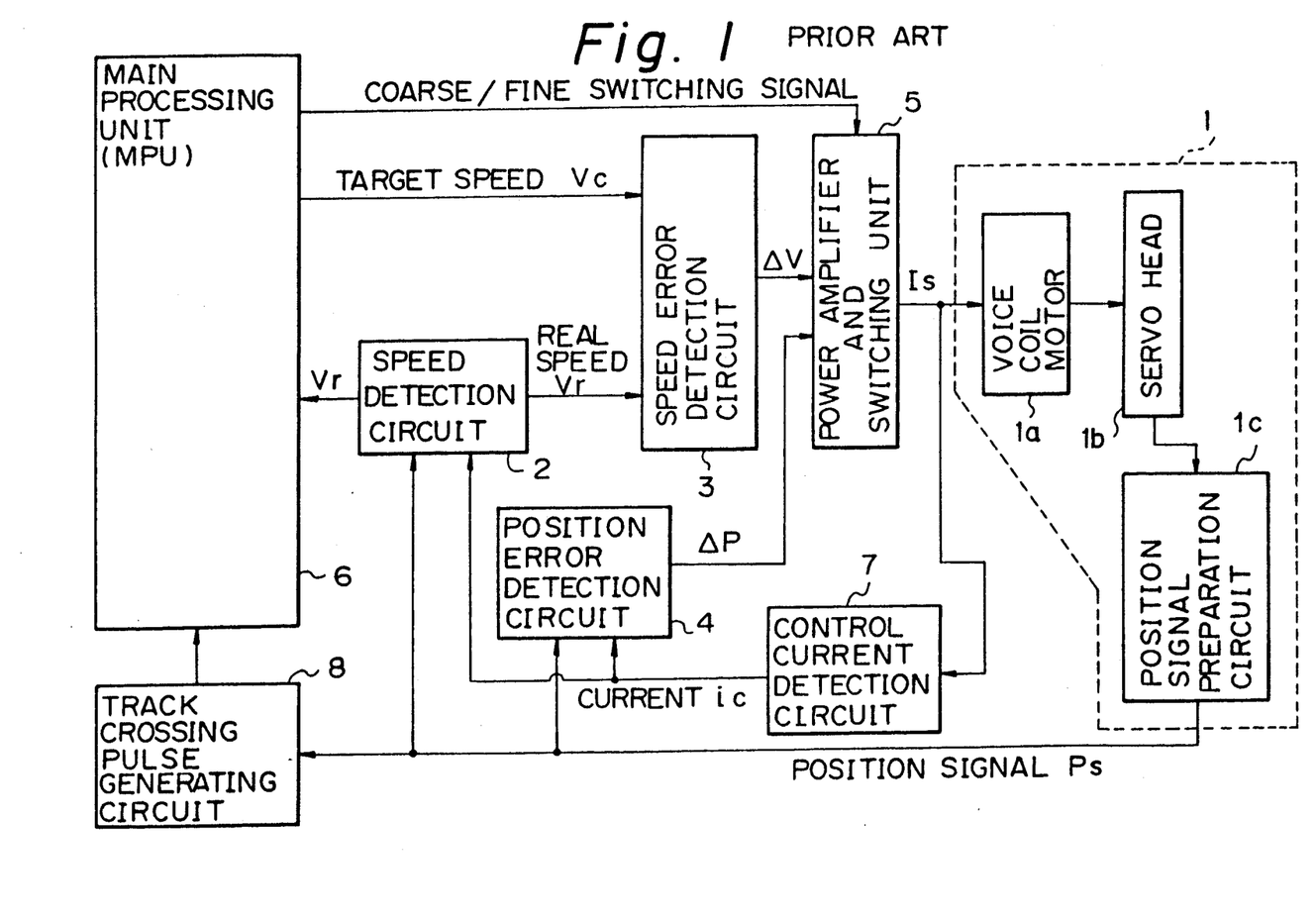
FIG. 1 is a block diagram of a prior art servo circuit.
Figure 2:
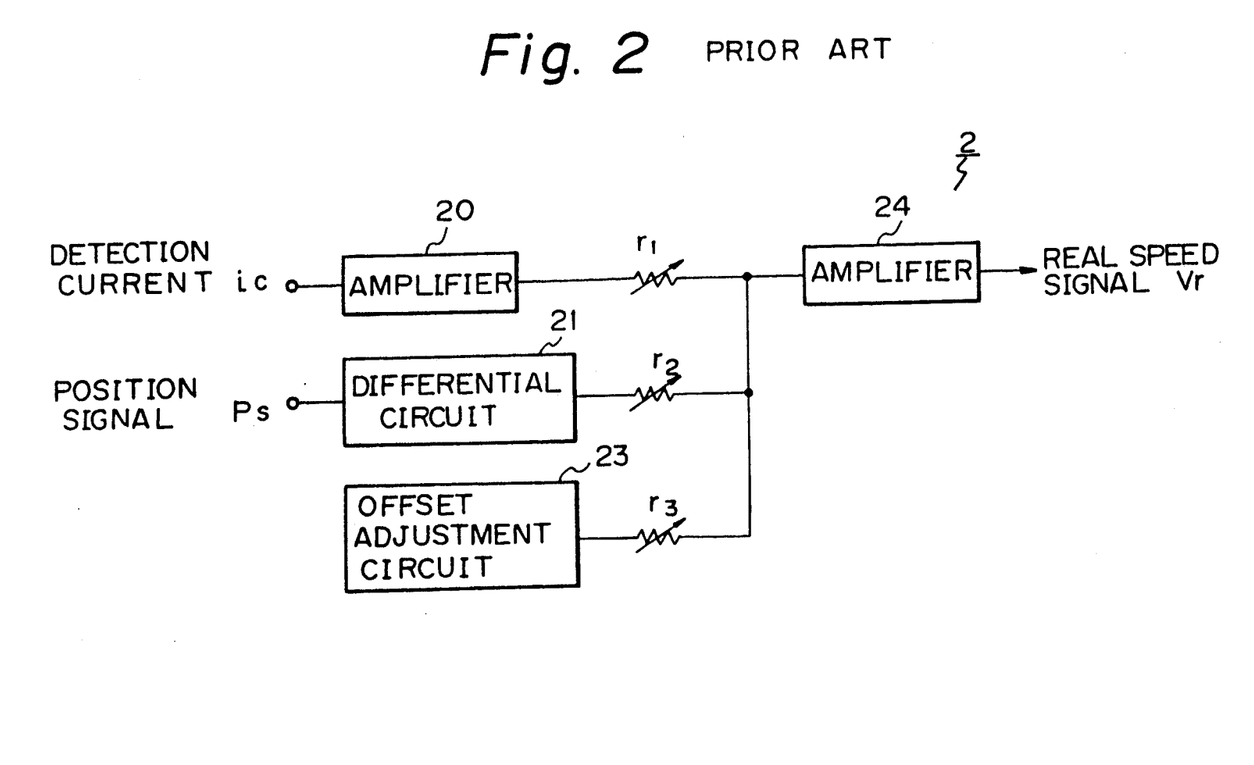
FIG. 2 is a block diagram of a portion of the servo circuit shown in FIG. 1.

FIG. 1 and FIG. 2 are block diagrams of the prior art.

In FIG. 1, reference numeral, 1 is a servo object which has a voice coil motor 1a, a servo head 1b moved by the voice coil motor 1a, and a position signal preparing circuit 1c for preparing the position signal Ps from the signal read by the servo head 1b.

Reference numeral 2 is a speed detection circuit, which detects, a real speed Vr from the position signal Ps and a detection current ic. Reference numeral 3 is a speed error detection circuit, which generates a speed difference $\Delta V$ between the later mentioned target speed Vc and the real speed Vr.

Reference numeral 4 is a position error detection circuit, which generates a position error signal $\Delta P$ from the position signal Ps and the detection current ic and performs position control. Reference numeral 5 is a power amplifier and switching unit, which has a changeover switch and power amplifier and switches connections of the speed error detection circuit 3 or position error detection circuit 4 to the servo object 1 by a coarse (speed control)/fine (position control) switching signal.

Reference numeral 6 is a main processing unit which is formed by a microprocessor and which generates a target speed curve Vc in accordance with the amount of movement. The main processing unit 6 also monitors the position of the servo object 1 using track crossing pulses to generate a signal for switching from coarse control (speed control) to fine control (position control) in the vicinity of the target position.

Reference numeral 7 is a control current detection circuit, which detects the control current Is of the power amplifier 5 and generates a detection current signal ic. Reference numeral 8 is a track crossing pulse generating circuit which generates track crossing pulses from the position signal Ps and outputs them to the main processing unit 6.

When the number of tracks to move (amount of movement) is given, the main processing unit 6 generates a target speed Vc in accordance with the number of tracks to move, and drives the voice coil motor 1a by speed control. In addition, the main processing unit 6, when near the target position, switches the switching unit 5 to the position control side and performs position control on the voice coil motor 1a for positioning at the desired track.

The speed detection circuit 2, as shown in FIG. 2, has an amplifier 20 for amplifying the detection current ic, a differential circuit 21 for integrating the position signal Ps and generating a speed component; an offset adjustment circuit 23, and an amplifier 24 for adding these outputs and amplifying the same and can be initially adjusted in gain by operating adjustment resistors r1 and r2.

Figure 3A:
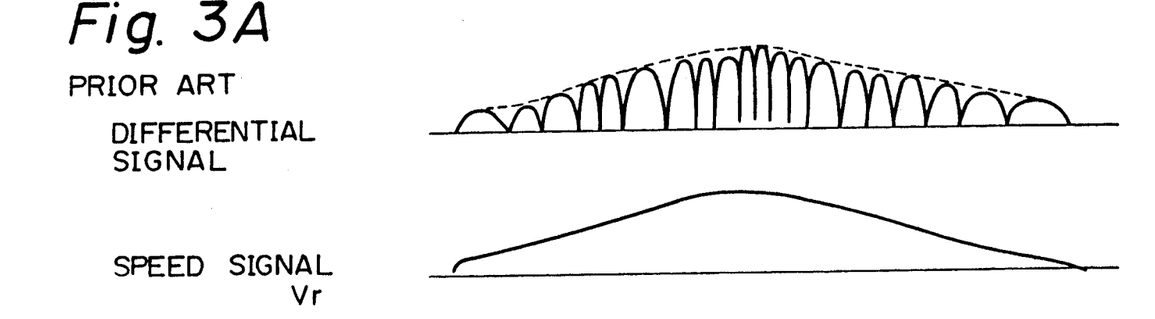
FIG. 3A and 3B are graphs of the speed of the prior art shown in FIG. 1.

In this way, speed control is performed by supplying to the voice coil motor 1a, as a speed error signal $\Delta V$, the difference between a target speed controlled by the difference counter decremented by a track crossing pulse and a speed signal Vr prepared from a differential signal of a position signal Ps and a current detection signal as shown in FIG. 3A.

The prepared speed signal Vr is initially set so as to show the correct value by variable resistors r1 and r2.

During a high speed seek (movement), the number of position signals Ps per unit time is high, as shown in FIG. 3A. Along with this there are many differential signals generated, so the gap between the speed signal Vr prepared by the circuit and the actual speed is not that large.

Figure 3B:
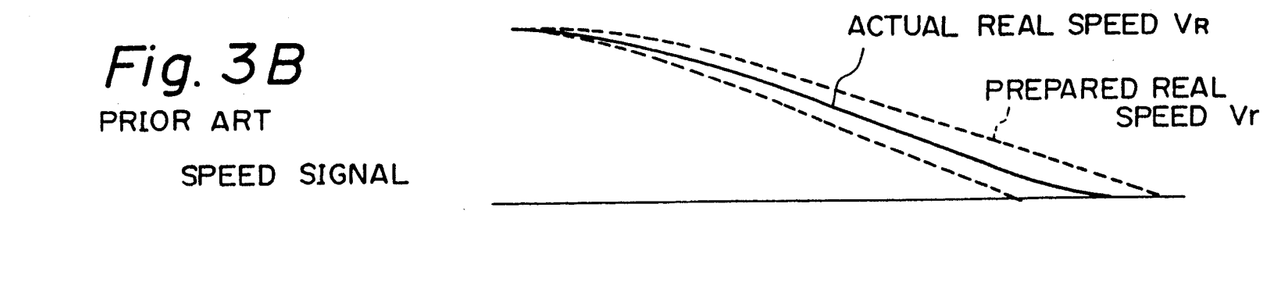

As shown in FIG. 3B, however, when the speed becomes low, the number of differential signals per unit time falls and the gap between the actual speed increases.

To cover for this, the current detection signal ic is being added to, but no great improvement can be expected from this.

That is, the maximum speed has been rising more and more in recent years so as to enable high speed seek operations, but the amount of adding to the current detection signal ic cannot be increased along with the speed. The reason is that during a high speed seek operation, the current detection signal ic is not required, so it is not possible to add a large enough amount to have an impact on the high speed seek operation.

This difference with the actual speed during low speed operation is particularly a problem in a deceleration process. A problem has arisen in that the following performance falls when deceleration is completed.

Therefore, overshooting or undershooting due to relaxation of the magnetic flux of the voice coil motor can occur, the weight of the voice coil motor in the seek direction has an effect, and air flow due to rotation of the magnetic disk, or other outside disturbance occur.

Therefore, the present invention has as its object the reduction of the gap between the prepared speed signal and the actual speed and improvement of the following characteristic of the servo object when deceleration is completed. The servo positioning circuit according to the present invention will now be explained in detail.

Figure 4A:
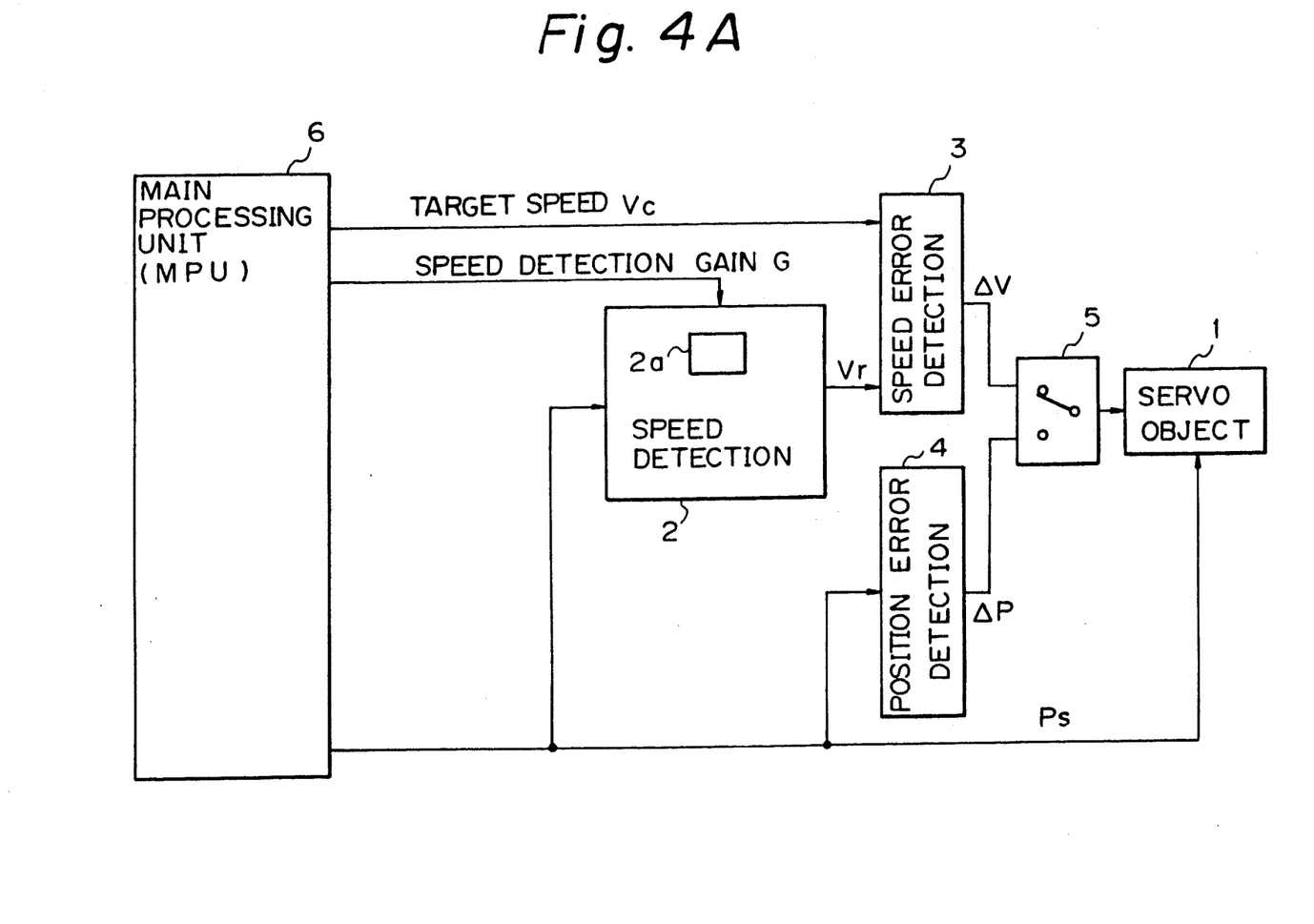
FIG. 4A is a block diagram of a first embodiment according to the present invention.
Figure 4B:
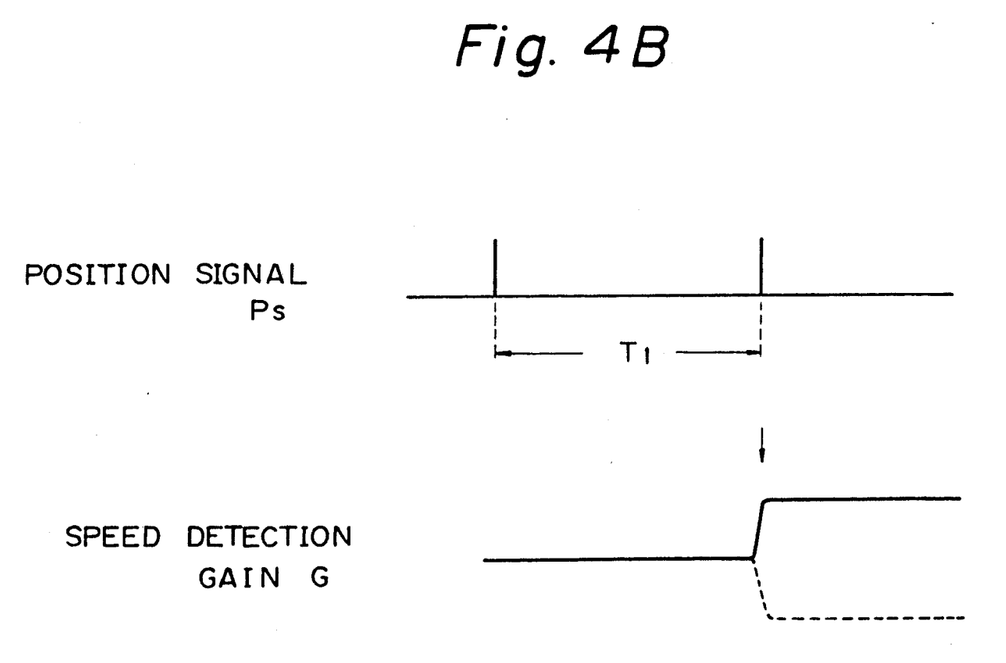
FIG. 4B is a timing diagram of the present invention shown in FIG. 4A.

FIGS. 4A and 4B are a block diagram and a timing diagram, respectively explaining the according to the present invention.

The present invention provides a servo circuit having a speed detection circuit 2 for detecting a real speed Vr from a position signal Ps from an object 1 under servo control; a speed error detection circuit 3 for generating an error $\Delta V$ between a target speed Vc and the real speed Vr; a position error detection circuit 4 for generating a position error signal $\Delta P$ from the position signal Ps; a switching unit 5 for switching the connection of the servo object 1 to the speed error detection circuit 3 or the position error detection circuit 4; and a main processing unit 6 for controlling the switching of the switching unit 5. In the vicinity of the target position, speed control by the speed error detection circuit 3 is switched to position control by the position error detection circuit 4. A provision is made for a speed detection gain adjustment unit 2a in the speed detection circuit 2. The main processing unit 6 measures the intervals T1 between the position signals and based on the measured value changes the detection gain G of the speed detection gain adjustment unit 2a.

The interval T1 between position signals shows the real speed. When the real speed is faster than the target speed, the prepared speed signal becomes too slow compared with the real speed signal. When the real speed is slower than the target speed, the prepared speed signal becomes too fast compared with the real speed signal Therefore, the prepared speed signal is corrected by changing the speed detection gain in accordance with the interval between position signals, that is, the real speed.

Figure 5:
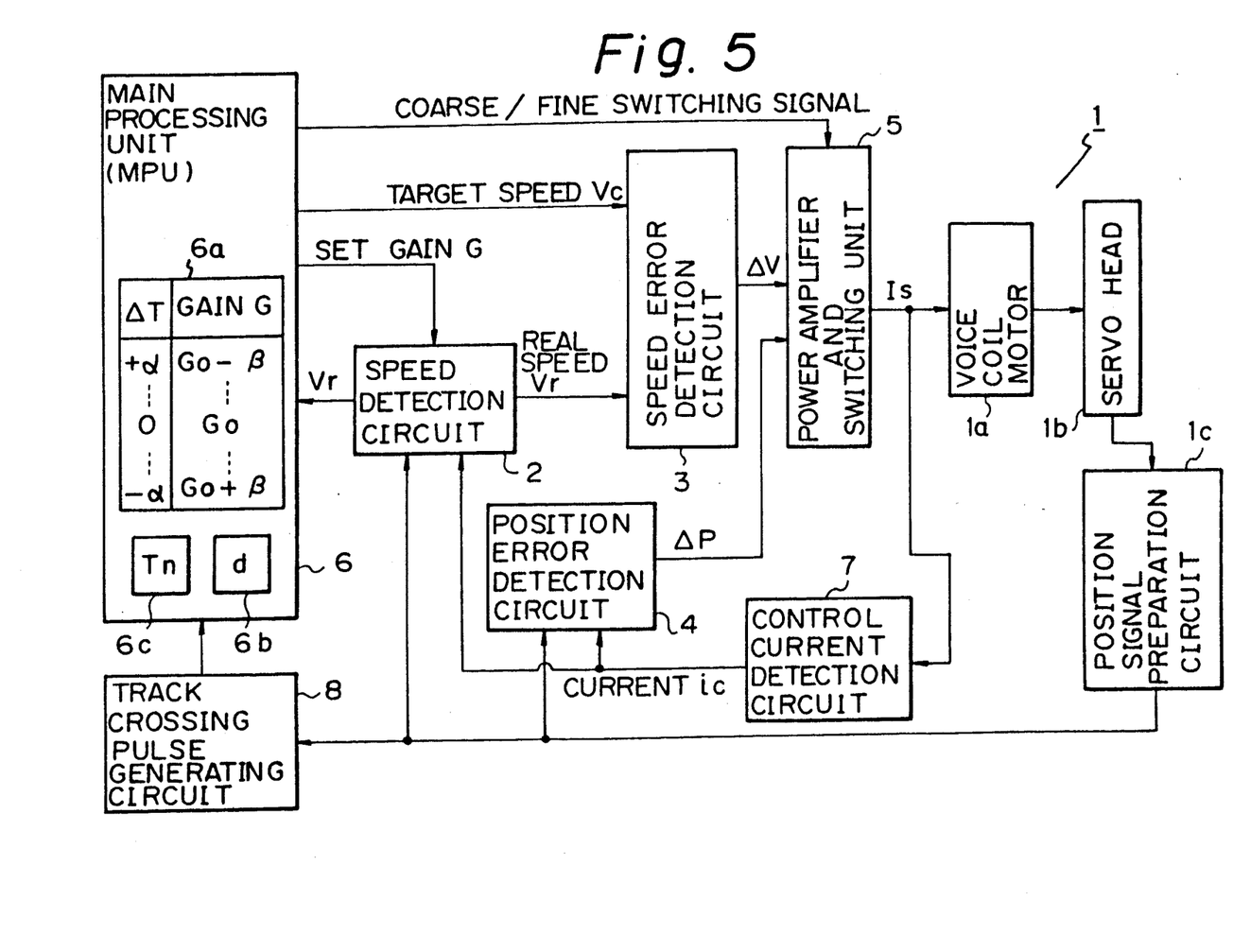
FIG. 5 is a block diagram of a second embodiment according to the present invention.

FIG. 5 is a block diagram of a first embodiment of the present invention.

Figure 6:
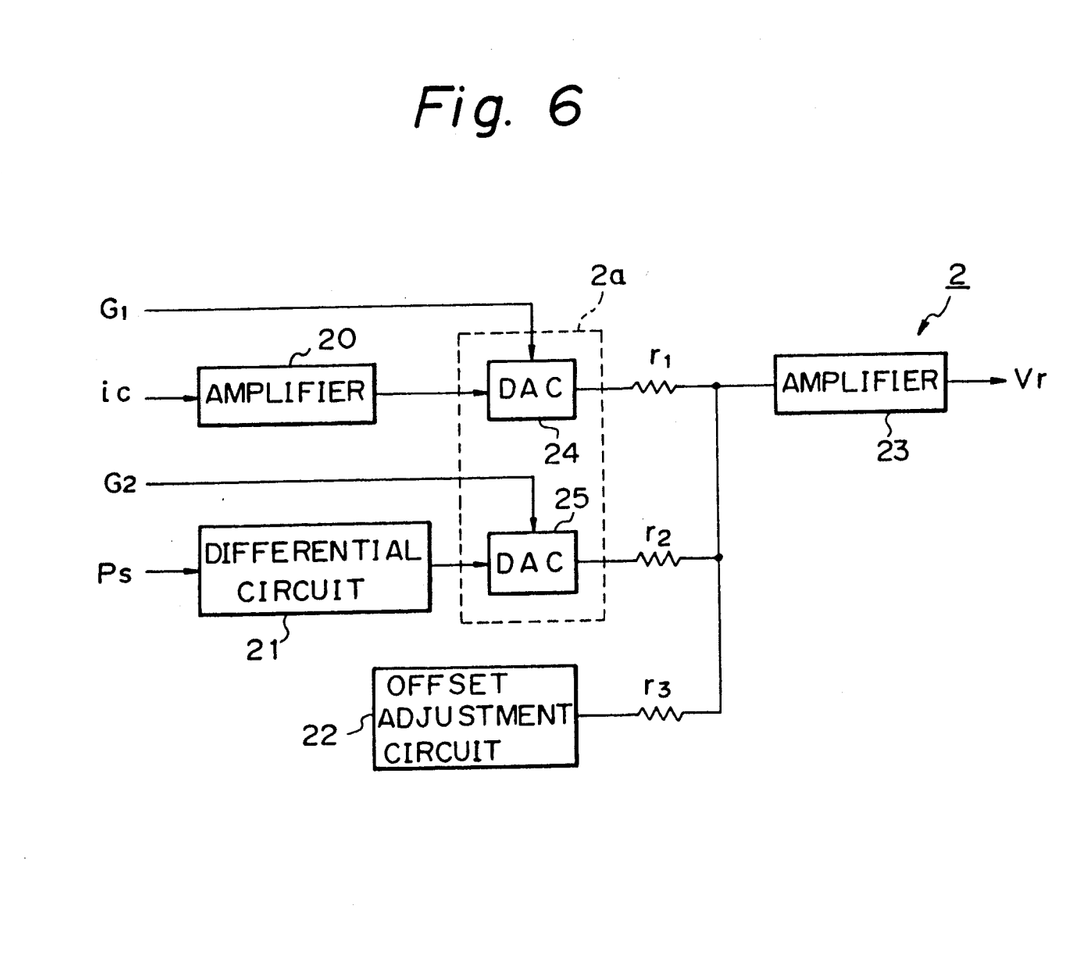
FIG. 6 is a block diagram of a speed detection circuit shown in FIG. 5.

FIG. 6 is a block diagram of a speed detection circuit in the circuit of FIG. 5.

In the figures, elements the same as those shown in FIG. 1, FIG. 2, and FIGS. 4A and 4B are shown by the same symbols.

In FIG. 5, reference numeral 6a is a gain table, which stores the differential gain G according to the time difference (speed difference) $\Delta T$.

The differential gain G, assuming that the measured value of the interval of the track pulses is Tn, that, the predetermined value of a target speed is Td and that $\Delta T = Tn - Td$, is set to be proportional to $\Delta T$. If $\Delta T$ is positive, since the actual speed is slower than the target speed, the gain is made small (Go$-\beta$) so that the prepared speed signal is made slower (smaller). If $\Delta T$ is negative, the gain is made large (Go$+\beta$).

Reference numeral 6b is a difference counter which is set with a difference value d. The difference counter is decremented with each detection of a track crossing pulse. The remaining difference is displayed.

Reference numeral 6c is a timer which measures the intervals of the track crossing pulses.

In FIG. 6, reference numerals 24 and 25 are multiplication type digital/analog converters DAC (D/A converters), which multiply a current gain G1 from the main processing unit 6 with the detected current from the amplifiers 20. The DACs 24 and 25 also multiply a differential gain G of the main processing unit 6 with the speed signal of the differential circuit 21 and output the results DACs 24 and 25 form a speed detection gain adjustment unit 2a. In this case, the detection current ic corresponds to the speed signal.

Figures 7, 7A:
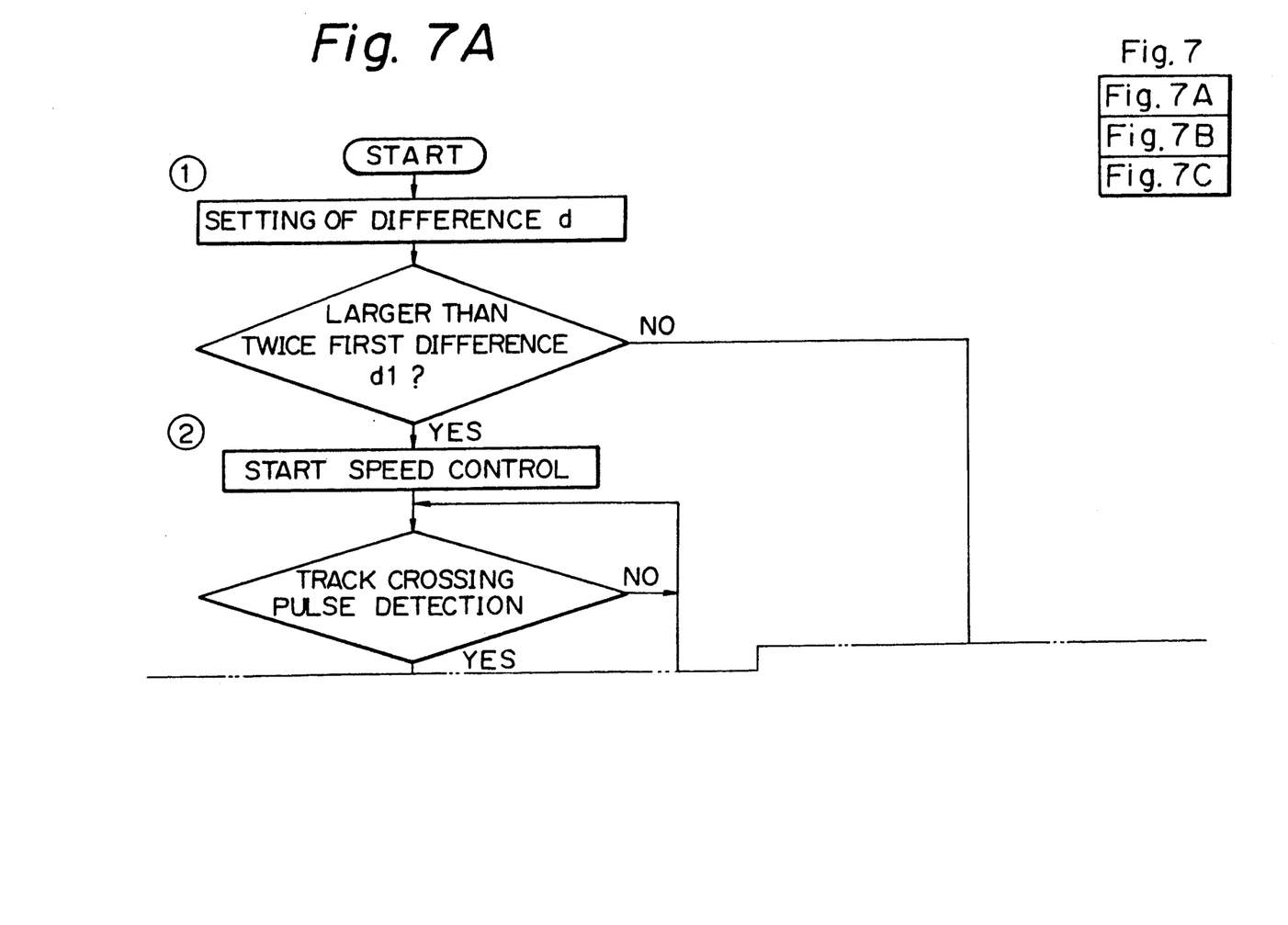
Figure 7B:
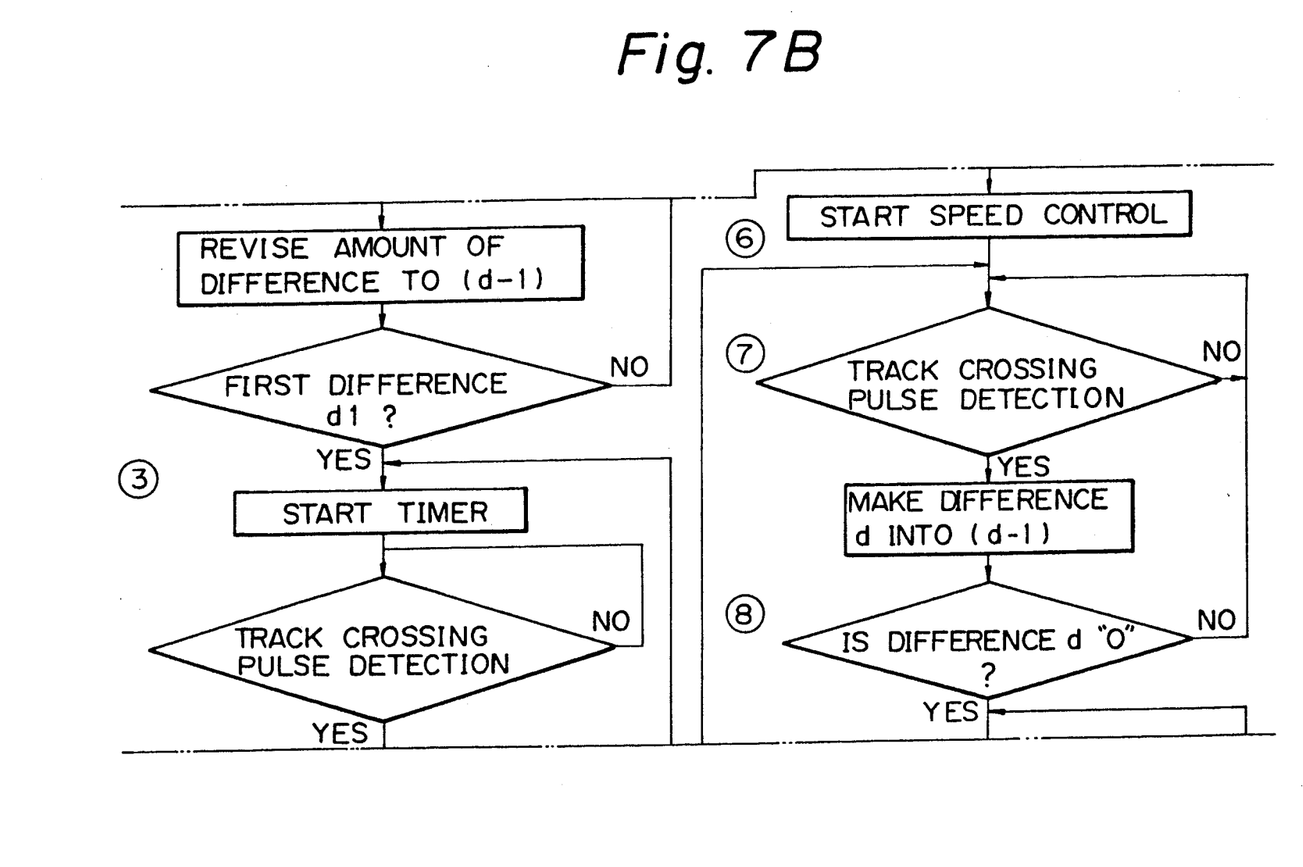
Figure 7C:
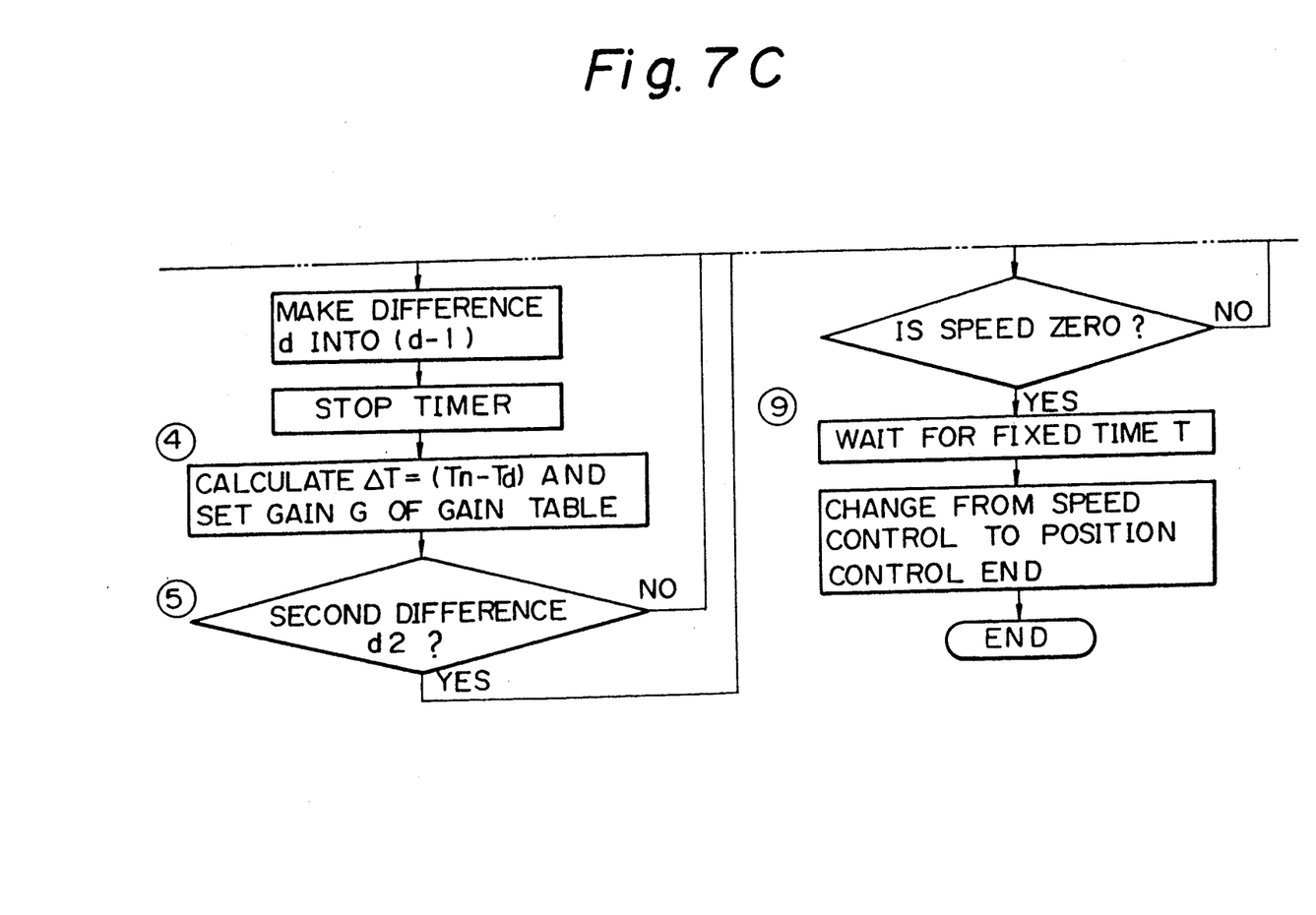

FIG. 7 including is a flow chart of the seek processing of embodiment of the present invention.

Figure 8:
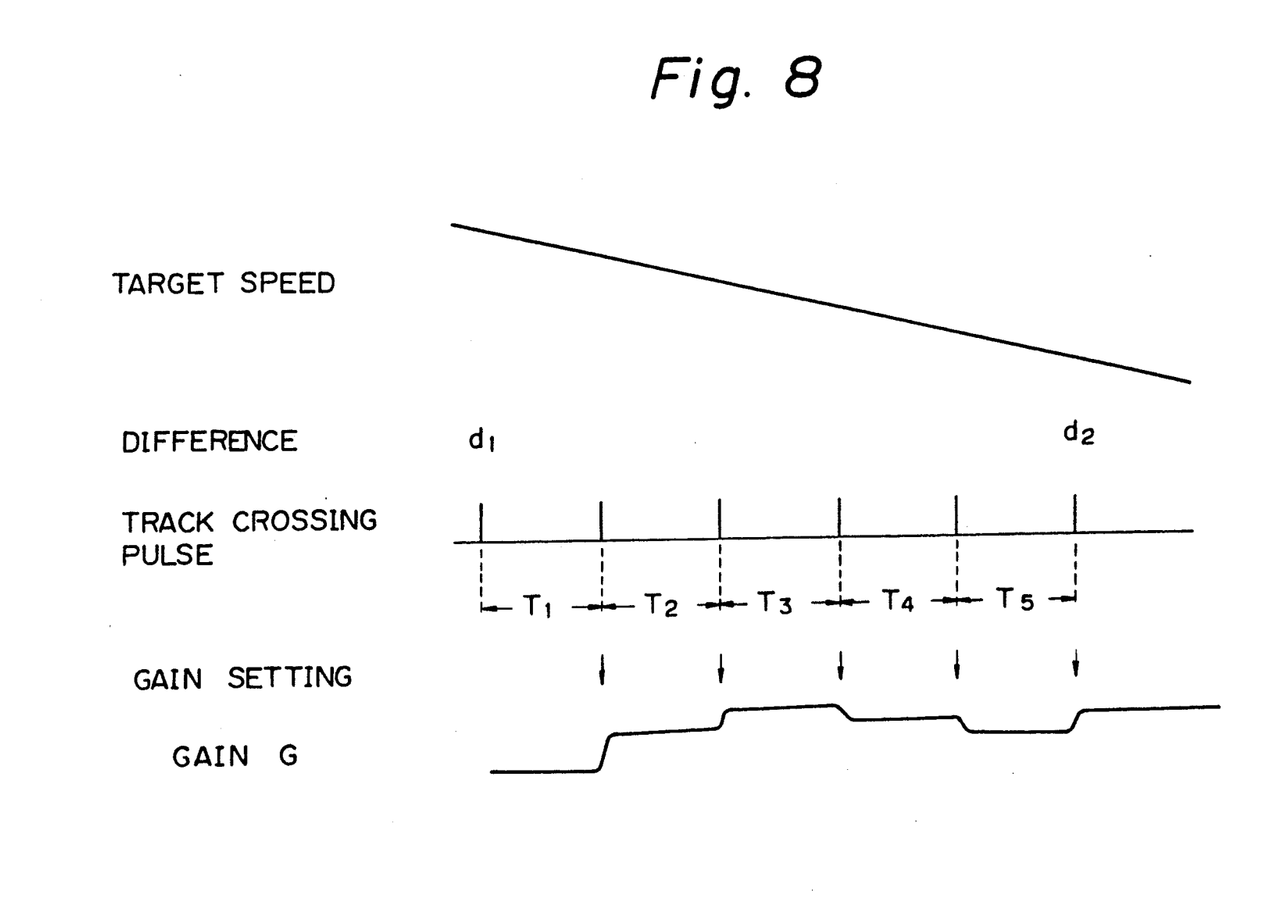
FIG. 8 is a timing diagram during the operation of the present invention.

FIG. 8 is a timing diagram of the operation of an embodiment of the present invention. Referring to FIG. 7.

[1] The main processing unit (hereinafter referred to as the "MPU") 6 calculates a difference d in accordance with the track position and the current track position specified by an upper unit and sets it in the difference counter 6b.

Next, the MPU 6 judges if the difference d is greater than twice a first difference d1.

If the difference d is larger than twice first difference d1, the first difference d1 is a period of deceleration. During the period of deceleration, control by measurement of the track crossing pulses is possible, so the control proceeds to step [2]. If the difference d is not larger than twice the first difference d1, then the deceleration period is short and the above control is meaningless, so the control proceeds to step [6].

[2] Next, the MPU 6 starts the speed control.

That is, the MPU 6 orders coarse control (speed control), so the voice coil motor 1a is controlled in speed by the speed error signal ΔV of the speed error detection circuit 3.

Further, in the speed detection circuit 2, the real speed Vr according to the set gain (G0) is produced.

The MPU 6 monitors the track crossing pulses of the track crossing pulse generating circuit 8 and when detecting a track crossing pulse, refreshes the content of the difference counter 6b to (d−1).

Further, the target speed curve is modified in accordance with the content of the difference counter 6b.

The MPU 6 then judges if the content of the difference counter 6b is the scheduled first difference d1 at the start of the measurement and if not d1, returns to the detection of the track crossing pulses.

[3] If the content of the difference counter 6b is d1, then the MPU 6 is made to start the timer 6c.

Then, the MPU 6 monitors the track crossing pulses and if it detects a track crossing pulse, refreshes the difference counter 6b to (d−1) and stops the timer 6.

[4] The MPU 6 reads the measured value Tn of the timer 6c and resets the timer 6c at each time.

Then, the MPU 6 calculates the time differences ΔT with the predetermined value Td of the scheduled speeds of the various differences from (Tn−Td).

Further, the MPU 6 refers to the gain table using ΔT as the key to find the differential gain G.

If ΔT is positive, Tn>Td and the actual speed is slow, so a small (Go-β) differential gain is obtained to make the prepared speed signal Vr small. If ΔT is negative, a large (Go+β) differential gain is obtained to make the prepared speed signal Vr large.

The thus obtained differential gain G is input to the D/A converter 25 of the speed detection circuit 2 by the MPU 6.

[5] Next, the MPU 6 investigates if the content of the difference counter 6b is the second difference d2 at the end of the measurement and if it is not d2, returns to step [3] to continue the measurement. If the content of the difference counter is d2, the control proceeds to step [7] to stop the measurement.

[6] On the other hand, at step [1], if the difference d is larger than twice the first difference d1, the same speed control as in step [2,]is started.

[7] The MPU 6 monitors the track crossing pulses and if it detects a track crossing pulse, refreshes the content of the difference d of the difference counter 6b to (d−1).

[8] The MPU 6 then judges if the content of the difference counter 6b is "0". If it is not "0", control returns to step [7].

If the content of the difference counter 6b is "0", the vicinity of the target position has been reached. The MPU 6 then investigates the real speed Vr of the speed detection circuit 2 and judges if the real speed Vr is near zero of a fixed slice.

[9] If the real speed Vr is near zero under a fixed slice, the MPU 6 waits for a certain time T and then switches the coarse/fine switching signal to fine.

By this, the switching unit 5 switches to the fine (position control) side, and the voice coil motor 1a is controlled in position by the position error signal ΔP of the position error detection circuit 4.

In this way, as shown in FIG. 8, during deceleration, in the interval from the difference value d1 at the scheduled start of the measurement to the difference value d2 at the end of the measurement, the interval (time) Tn of the track crossing pulses is measured. The difference ΔT with the values Td of the various differences preset is taken and the differential gain G is determined.

If ΔT is positive, the measured value Tn becomes larger than the set value Td and the real speed is slower, so the differential term gain G is reduced by that difference. Conversely, if smaller than Td, the real speed is faster, so the differential term gain G is raised by that difference.

This control is performed n number of times (five times in FIG. 8) from the first difference d1 to the second difference d2 so as to perform trial runs several times and set an averaged, appropriate gain.

Further, the differences d1 and d2 are preferably close to the end of the deceleration.

In the above embodiment, n number of times of measurement and gain settings were performed during the differences d1 and d2, but once is also sufficient. Further, the added n number of times of measurement values can be compared with a predetermined setting to obtain the difference.

In addition to the differential gain G, the current detection gain G1 may be made to change according to the measured value. Also, the gain table 6a need not be used, but rather calculations can be used to find the gain.

An explanation was made of a magnetic disk apparatus as an example of the servo object, but the invention may be applied to other apparatuses as well.

Above, an explanation was made of the present invention using embodiments. The present invention, however may be modified in many ways within the scope of the gist of the invention. These modifications are not excluded from the present invention.

As explained above, according to the present invention, the interval between position signals is measured and the speed detection gain changed based on the measured value, so there is little gap between the prepared speed signal and actual speed even during deceleration and it is possible to improve the following characteristic at the time of completion of deceleration. In particular, overshooting or undershooting due to relaxation of the magnetic flux of the voice coil motor, effects of weight in the seek direction, air flow due to rotation of the magnetic disk, or other outside disturbances is reduced, the maximum speed increased, and problem-free deceleration is realized even during high speed operation.

I claim:

1. A servo circuit for controlling the positioning of a servo object under servo control to a target position by switching from speed control to position control in the vicinity of the target position, comprising:
   speed detection means for detecting a real speed based on position signals transferred from a servo head, said speed detection means including a speed detection gain adjustment unit;
   speed error detection means for generating an error between a target speed and the real speed;
   position error detection means for generating a position error signal based on the position signals;
   switching means for switching the connection of the servo object between said speed error detection means and said position means; and
   main processing means for generating the target speed in accordance with the position signals from the servo object and controlling the switching of said switching means, said main processing means measuring the intervals between the position signals, and changing the detection gain of said speed detection gain adjustment unit in accordance with the measured value of the intervals.

2. A servo circuit as claimed in claim 1, wherein said main processing means comprises a gain table storing a differential gain defined in proportion to a speed difference between the real speed and the target speed, the real speed being obtained by measuring the interval between position signals, and the target speed being generated by said main processing means.

3. A servo circuit as claimed in claim 2, wherein said main processing means further comprises a difference counter set with a difference value which is decremented with each detection of a track crossing pulse, and which displays a remaining difference.

4. A servo circuit as claimed in claim 2, wherein said main processing means further comprises a timer for measuring the intervals of a track crossing pulse.

5. A servo circuit as claimed in claim 1, wherein said main processing means further comprises a difference counter set with a difference value which is decremented with each detection of a track crossing pulse, and which displays a remaining difference.

6. A servo circuit as claimed in claim 5, wherein said main processing means further comprises a timer for measuring the intervals of the track crossing pulses.

7. A servo circuit as claimed in claim 1, wherein said main processing means further comprises a timer for measuring the intervals of a track crossing pulse.

8. A servo circuit as claimed in claim 1, wherein said speed detection means further comprises:
   an amplifier for amplifying a detection circuit; and
   a differential circuit for differentiating the position signal and obtaining a speed signal.

9. A servo circuit as claimed in claim 5, wherein said speed detection gain adjustment unit comprises:
   a first multiplication type digital/analog converter a first multiplication type digital/analog converter, operatively connected to said main processing unit and said amplifier, for receiving a first gain from said main processing means from said amplifier; and
   a second multiplication type digital/analog converter, operatively connected to said main processing unit and said differential circuit, for receiving a second gain from said main processing means and the speed signal from said differential circuit.

10. A servo circuit as claimed in claim 1, wherein said speed detection gain adjustment unit comprises:
    an amplifier for amplifying a detection current;
    a differential circuit for differentiating the position signal and obtaining a speed signal;
    a first multiplication type digital/analog converter, operatively connected to said main processing means, and said amplifier, for receiving a first gain from said main processing means and the detection circuit from said amplifier; and
    a second multiplication type digital/analog converter, operatively connected to said main processing unit and said differential circuit, for receiving a second gain from said main processing means and the speed signal from said differential circuit.

* * * * *

UNITED STATES PATENT AND TRADEMARK OFFICE
CERTIFICATE OF CORRECTION

PATENT NO. : 5,194,788  
DATED : MARCH 16, 1993  
INVENTOR(S) : SHUICHI HASHIMOTO

It is certified that error appears in the above-indentified patent and that said Letters Patent is hereby corrected as shown below:

On the title page, Item  
    [57] ABSTRACT  
    line 8, "to" should be --between--.

Col. 2,   line 3, "sion" should be --sions--;  
         line 14, "FIG." should be --FIGS.--;  
         line 24, "FIG. 7a, 7b and 7c" should be --FIGS. 7A, 7B and 7C--.

Col. 3,   line 67, "explaining the" should be deleted.

Col. 4,   line 28, "signal" should be --signal.--;  
         line 47, "actual" should be --real--;  
         line 64, "results DACs should be --results. DACs-;  
         line 67, "FIG. 7 including is" should be --FIG. 7 including FIGS. 7A-7C is--;  
         line 68, "of embodiment" should be --of an embodiment--.

Col. 5,   line 3, "7." should be --7,--;  
         line 11, "twice first" should be --twice a first--;  
         line 64, "[2,]is" should be --[2] is--.

UNITED STATES PATENT AND TRADEMARK OFFICE
CERTIFICATE OF CORRECTION

PATENT NO. : 5,194,788

DATED : MARCH 16, 1993

INVENTOR(S) : SHUICHI HASHIMOTO

It is certified that error appears in the above-indentified patent and that said Letters Patent is hereby corrected as shown below:

Col. 6, line 44, "find" should be --determine--.

Col. 8, line 16, "a first multiplication type digital/analog converter" should be deleted;

line 20, "means from" should be --means and the detection current from--.

Signed and Sealed this

Twenty-eighth Day of December, 1993

Attest:

BRUCE LEHMAN

Attesting Officer     Commissioner of Patents and Trademarks